Feb. 6, 1934.    M. S. JOHNSON    1,945,692
BRAKE SLACK ADJUSTER
Filed Sept. 12, 1929    3 Sheets-Sheet 2
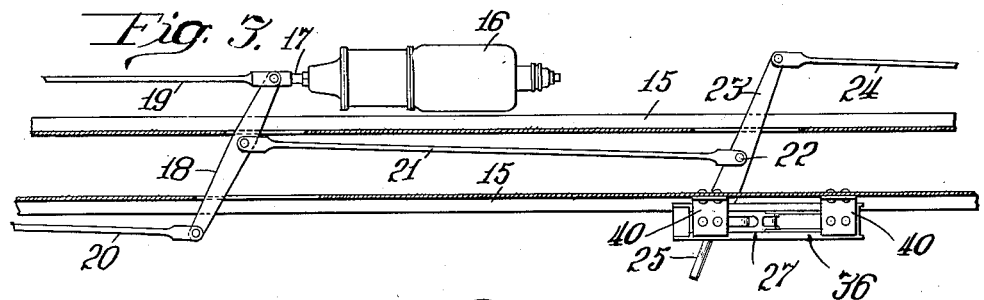
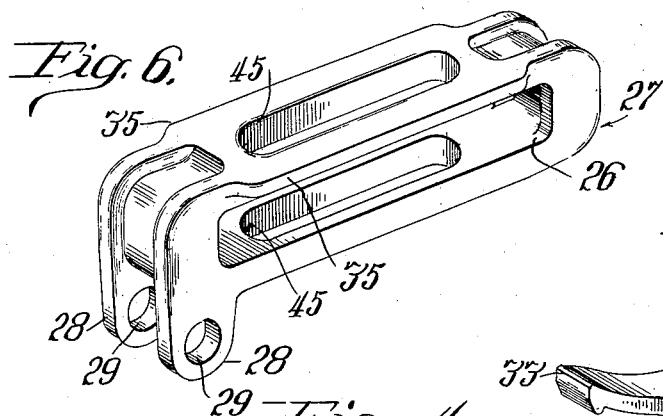
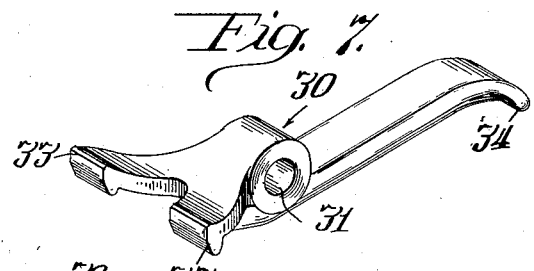
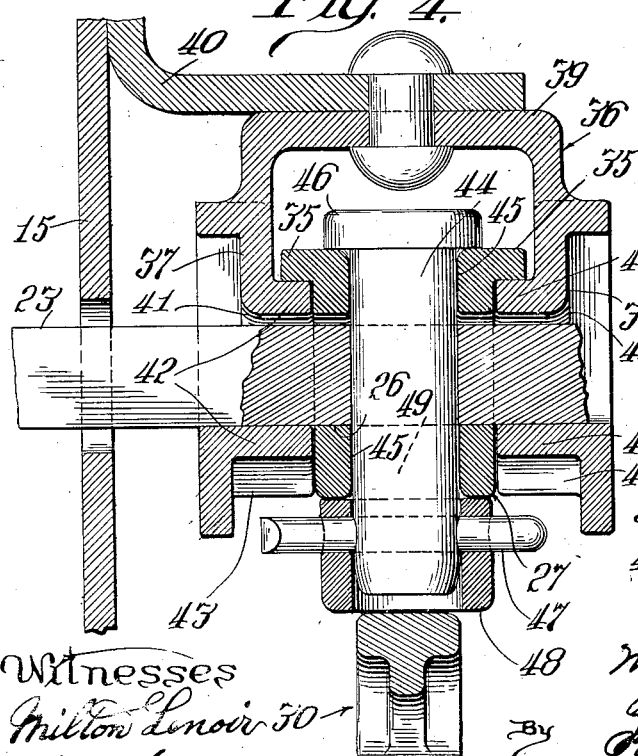
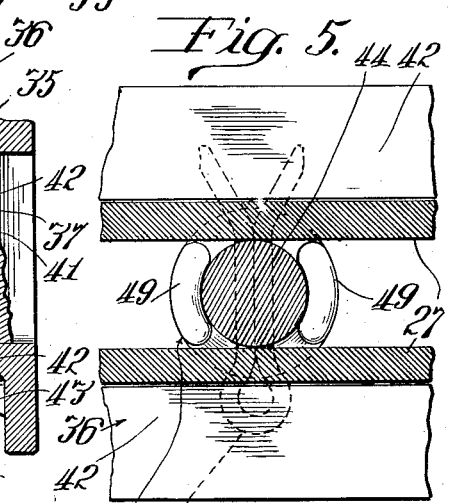

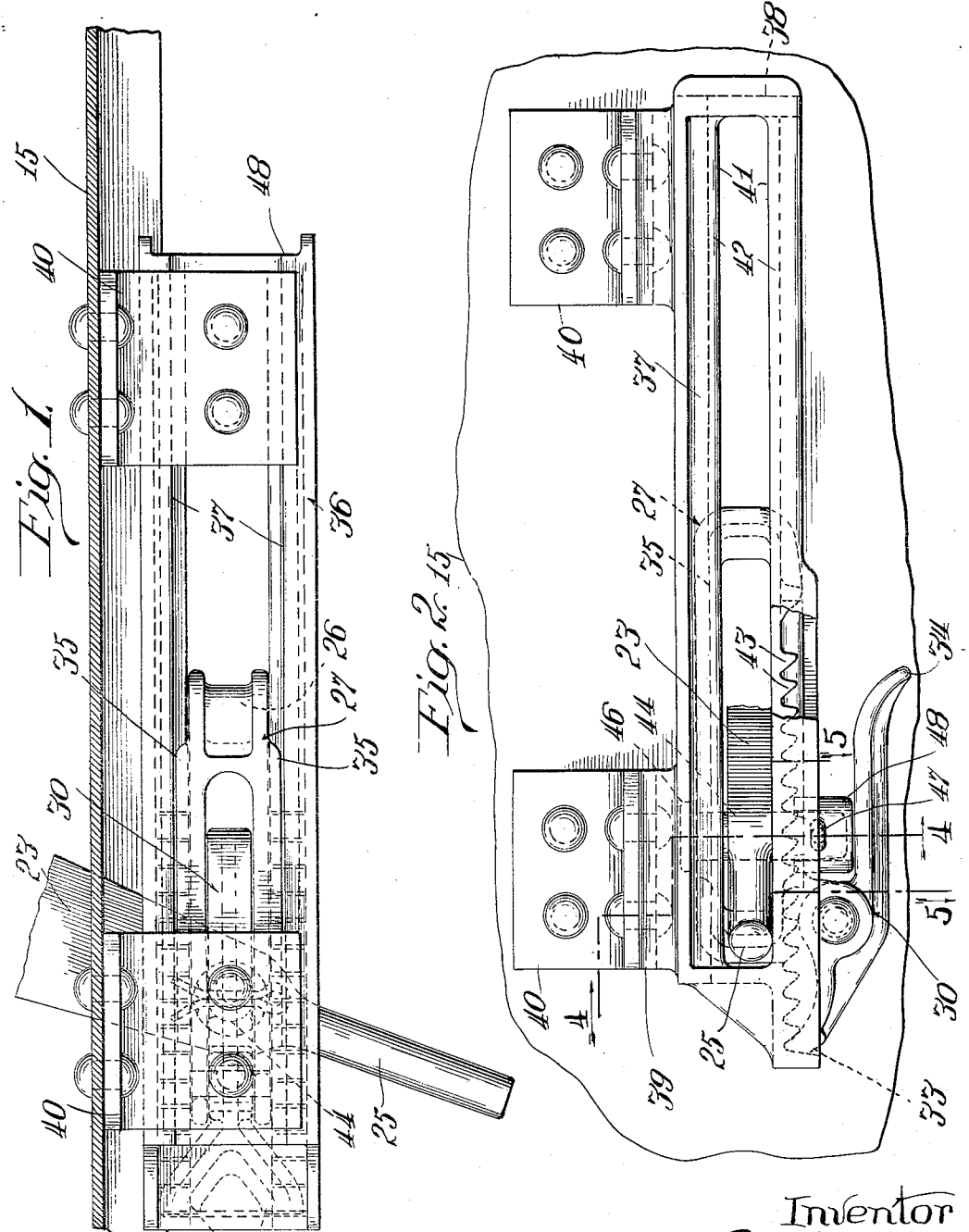

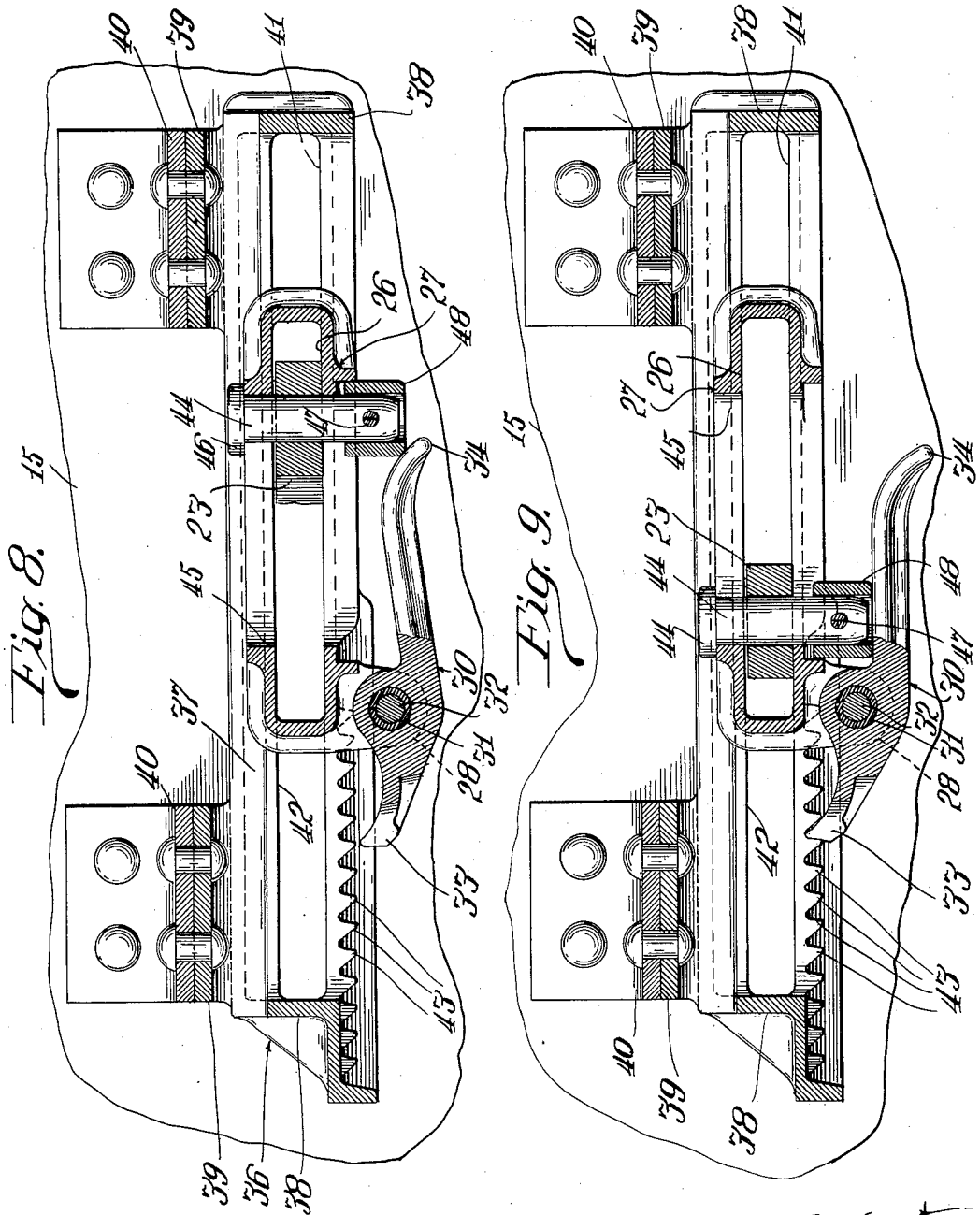

Patented Feb. 6, 1934

1,945,692

UNITED STATES PATENT OFFICE 1,945,692

BRAKE SLACK ADJUSTER

Malcolm S. Johnson, Chicago, Ill., assignor to E. Payson Smith, Chicago, Ill.

Application September 12, 1929
Serial No. 392,019

1 Claim. (Cl. 188—200)

My invention relates to regulators for the brake gearing of railroad cars and more particularly to slack take-up or adjuster means adapted to be manually operated when occasion requires in order that proper movement of the brake gearing in keeping with the normal piston travel may at all times be obtained regardless of the condition of the brake-shoes. That is to say, my improved means is adapted to so position certain elements of the brake gearing or mechanism that a uniform piston travel may be maintained for efficient braking operation while at the same time maintaining proper predetermined brake shoe clearance.

The invention, more specifically speaking, involves a traveling or shiftable member adapted to be held or locked in its adjusted or shifted positions in a suitable supporting element or frame by means of a gravity controlled member or pawl whose locking position will be positively maintained during the normal operation.

That is to say, the usual operative position of an associated manually controlled member or lever will be maintained so that accidental movement or shifting of the traveling member is impossible.

The operation of the mechanism and the advantages of my invention will all be readily apparent from the following detailed description of the accompanying drawings, wherein:—

Figure 1 is a plan view of my improved mechanism shown applied to a portion of a car underframe, or center sill of which only a portion is shown, as well as only a portion of a lever of the brake gearing.

Figure 2 is a side elevation of the structure as shown in Figure 1.

Figure 3 is a plan view of a portion of brake gearing, illustrating the application of my invention thereto.

Figure 4 is a cross sectional view taken substantially on the line 4—4 of Figure 2, looking in the direction of the arrows.

Figure 5 is a detail sectional view taken substantially on the line 5—5 of Figure 2, viewed as indicated by the arrows.

Figure 6 is a detail view, in perspective, of the shiftable or movable member.

Figure 7 is a perspective view of the movable member locking means.

Figure 8 is a longitudinal sectional view of my improved means, illustrating positions of the respective elements during a take-up operation.

Figure 9 is a similar view illustrating the adjusted position of the elements positioned to take up certain brake shoe wear.

The application of my invention to a conventional type of brake operating mechanism of a railroad car is shown in Figure 3 for purposes of exemplification, with the draft or center sills of a car being shown at 15, 15; the usual air cylinder being shown at 16, with its piston 17 operatively connected, by means of proper pivotal connection, with lever 18 and with rod 19, which latter is intended to be connected at its opposite end with the usual hand operated brake staff not shown. The lever 18, like other levers of the brake gearing, usually extends through suitable slots in the center sills (although in some instances they extend beneath the sills) and has its opposite end pivotally connected with rod 20 which controls the usual brake-beam controlling levers at one end of the car; the latter elements not being shown as they form no part of my invention.

The lever 18, at an intermediate point, has a rod 21 pivotally connected thereto; while the other end of rod 21 is pivotally connected at 22 to a semi-floating lever 23. The long end of semi-floating lever 23 has a rod 24 pivotally connected thereto; this rod 24 being adapted to control the brake-beam actuating levers at the end of the car opposite to those controlled by rod 20.

The free end of semi-floating lever 23 is preferably shown somewhat reduced to provide a suitable hand grasping portion 25; and this free end of the lever 23 is disposed through a horizontally disposed slot 26 which extends transversely through a movable or slidably mounted member 27.

The slot 26, in member 27, is of sufficient length to provide ample clearance for lever 23 in normal or take-up position; while the slots 45 in the top and bottom of member 27, are of sufficient length when lever 23 is in full take-up position to allow proper brake shoe clearance and piston to travel and also permit sufficient movement of the pivotal point of the lever beyond the end of the slidable member locking pawl later described.

The member 27, which is of a predetermined length, has one end provided with a pair of laterally spaced depending ears 28, 28, which are apertured at 29.

These ears 28, 28 receive the head-end of a pawl 30 therebetween; the pawl 30 being apertured at 31 to receive a hinge-pin 32 whereby the pawl is pivotally held in place.

The head of the pawl 30 is somewhat enlarged and provided with the upwardly sloping forked rack engaging portions 33, 33; while the tail end, which is comparatively long, is curved slightly downwardly at its immediate end, as shown at 34.

With the tail of the pawl of greater length than the head portion, it is apparent that the weight of the tail will constantly tend to tilt the head portion upwardly and hence normally keep the head portion in operative engagement with the rack of a supporting element later to be described.

The top of the movable member 27, at opposite sides, is made to extend slightly beyond the sides, as shown at 35, see Figures 4 and 6, for the purpose of slidably holding or supporting the member 27 in place.

My improved structure preferably also involves a suitable supporting casting or elongated element 36. This element 36 involves two spaced side walls 37, 37, formed integral with or connected by end walls 38, 38 and also adjacent the ends by top portions 39, 39. The top portions 39, 39 are shown provided with suitable angle plates or brackets 40, 40, whereby the structure may be properly secured to one of the center sill members 15 so as to rigidly hold the supporting element in place.

The element 36 has each side wall provided with a slot 41, which extends lengthwise throughout the major portion of the side walls; the element 36 being of comparative length so as to provide a slideway therein which will permit movement of the member 27 lengthwise thereof commensurate with the adjusted positions of the brake gearing necessary from an initial or new shoe and wheel position or condition to a maximum worn shoe and wheel condition.

The inner sides of the two side walls 37, 37 of element 36 are provided with the horizontal disposed flanges or enlargements 42, above and beneath the slots 41, see Figure 4, to provide suitable bearing for the hand-grasping portion 25 of the semi-floating lever 23 which extends through element 36 as well as through the member 27.

The top flanges 42 also provide a suitable slideway for the flanges or top extensions 35, 35 of member 27, as more clearly shown in Figure 4.

The lower flanges 42 of the element 36, and within the side walls thereof, are each provided for a predetermined distance at the forward end of the element with downwardly disposed teeth 43, to provide a double rack portion with which the bifurcated head portions 33, 33 of pawl 30 engage.

The teeth of the rack portions are formed so that movement of the member 27 back toward the forward end of supporting element 36 is impossible as long as the pawl 30 is in engagement with the rack portions.

The semi-floating lever 23, which extends through the side slots 41 of element 36 and through the side slots 26 in member 27, is operatively connected to member 27 by means of a pin 44. The pin 44 extends through the slots 45 formed in the top and bottom of member 27 and is provided with a head 46 adapted to rest on top of the member 27, as shown in Figure 4; and the pin is of length to extend somewhat beneath the member 27. In the particular exemplification, the pin is preferably apertured to receive a cotter or other suitable pin 47, whereby a suitable cap 48 is preferably held onto the bottom of the pin 44.

The cap 48 is slightly rounded, especially on its forwardly presented bottom side to enable it to ride up easily onto the curved tail end of the pawl 30 during adjusting operations.

In order that the pin 44 and its cap 48 will not rotate during operation and thereby foul the cotter-pin 47 through contact with the ears 28, 28 by member 27 and the apertured head portion of the pawl 30, I prefer to provide the upper perimeter of cap 48 with the upward extensions or arcuate lugs 49, 49, which fit into the bottom slot 45 of member 27, as shown in Figure 5. It is apparent that the lugs 49 will hold the cap 48, as well as pin 44, against rotation, with the result that the cotter-pin 47 will always be disposed transversely of the element 36 so that proper action or movement of lever 23 in member 27 is at all times possible.

In operation and when the brake-shoes are new and the wheel rims are not worn, the inner member 27 is disposed at the forward end of the slideway in supporting element 36, with the pawl 30 in engagement with the foremost teeth 43 of the rack portions of supporting element 36, as shown in Figures 1 and 2. Normally and during brake applying periods, the lever 23 is disposed through the forward ends of the slots 26 in member 27 as also shown in Figures 1 and 2 and bearing against the member 27, which, in conjunction with pin 44, constitutes a fulcrum point for lever 23.

The slots 45 in member 27 not only serve as means for maintaining proper brake shoe clearance and uniform piston travel, but these slots also permit the pivotal point of lever 23, namely of the pin 44 with its cap 48, to be moved toward the downwardly curved end 34 of the pawl 30 as shown in Figure 8, when it is necessary to take up slack in the brake gearing due to brake-shoe wear.

With the pin 44 and its cap 48 positioned as shown in Figure 8, it is apparent that the head end of the pawl 30 is free to slide rearwardly over the teeth 43 of the rack portions of the supporting element, thus permitting free movement backwardly of member 27 to an extent commensurate with the slack in the brake gearing; that is to say, in keeping with the amount of brake-shoe wear. In Figure 8 the mechanism is shown during a slack take-up operation; while in Figure 9 the mechanism is shown in its normal position after the take-up operation has been completed; the mechanism in Figure 9 being in position for brake applying operations, with the pin 44 at the forward ends of the slots 45, 45 in member 27.

These slack take-up operations are performed whenever the shoes become worn to an extent which would induce improper piston travel and therefore an improper positioning or angularity of the brake gear mechanism. To accomplish the take-up adjustments, the operator grasps end 25 of lever 23 and pulls the same backwardly, or toward the right as viewed in the figures, until the pivotal point of the lever reaches the opposite or right hand end of the slots 45 in member 27, at which time the end of pin 44 will be positioned at the downwardly curved end of the pawl 30 and the lever and pin will also be at the right hand end of the slots 45 of member 27, thus causing the member to also move therewith. This operation is continued until the brake-shoes are brought into contact with the wheels and further movement of the mechanism made impossible.

During such rearward or toward the right movement, the head of pawl 30 will slide over the teeth 43 and will engage with the teeth coincident to the head end of the pawl; the weighted or heavy tail end of the pawl causing the pawl to automatically lock the member 27 against return movement toward the left. As soon as air is introduced into the cylinder 16 for the next brake operation, the movement of the piston 17 and the other elements of the brake gearing will, through the pulling action of rod 21, cause the lever 23 with its pivot pin 44 to move toward the forward or left hand end of the slot 45 and therefore into proper position for braking operations; the curved pawl end and rounded cap or pin end permitting free movement of the pin relative to the pawl. As soon as the pin 44 has been moved back to normal position, it is apparent that the tail end of pawl 30 will be firmly held against any upward tilting movement through accidental contact or jars, with the result that the mechanism will at all times be securely locked in its adjusted positions.

It is apparent that the center sills or other car underframe members disposed longitudinally of the car may be employed as the supporting element of the mechanism, and that certain other modifications in the structure may be made without, however, departing from the spirit of my invention; and while I believe the drawings disclose the best embodiment of my invention, I do not limit myself to the precise construction shown and described.

What I claim and wish to secure by Letters Patent is:

In combination with a floating lever of the brake gear mechanism of a railroad car, slack adjusting mechanism comprising a supporting element disposed lengthwise of the car, a rack arranged longitudinally of said element, a member slidable lengthwise of the element, a pawl carried by said member and normally engaging the rack whereby movement of the member in one direction is normally prevented, and pivot means carried by said member whereby said floating lever is fulcrumed on said member, said means being adapted to lock the pawl in engagement with the rack when in normal position.

MALCOLM S. JOHNSON.